April 28, 1964  G. KNIAZEFF  3,131,341
SEMI-CONDUCTOR DEVICE COMMUTATED DYNAMO ELECTRIC MACHINE
Filed Oct. 24, 1960  3 Sheets-Sheet 1

INVENTOR
GEORGES KNIAZEFF
BY Toulmin & Toulmin
ATTORNEYS

United States Patent Office 3,131,341
Patented Apr. 28, 1964

3,131,341
SEMI-CONDUCTOR DEVICE COMMUTATED DYNAMO ELECTRIC MACHINE
Georges Kniazeff, 17 Ave. de Madrid, Neuilly, France, assignor of fifty percent to Societe Industrielle des Nouvelles Techniques Radioelectriques, Asnieres, France, a body corporate of France
Filed Oct. 24, 1960, Ser. No. 64,426
Claims priority, application France Oct. 23, 1959
7 Claims. (Cl. 318—138)

The present invention relates to an improvement in rotating direct-current electric machines for operation as generators or motors. The advantages afforded by such machines in many applications are known, but these advantages are often offset by the disadvantages arising out of the presence of the commutator effecting the commutation of currents of high strength generated in or supplied to the armature of the machine (depending upon whether the machine operates as a generator or as a motor). These disadvantages reside in the production of sparks at the brushes, despite the use of commutating poles provided with compensating windings, with resultant rapid wear on the commutator, and the production of interference and other defects, due to which alternating-current machines are sometimes preferred despite the fact that they are less convenient to use. In any case, the commutator, the dimensions of which must be proportional to the strength of the armature current, constitutes a costly part of the machine.

The present invention relates to a new rotating direct-current electric machine by means of which all the aforesaid disadvantages of the commutator can be obviated. The said machine is characterised by the fact that the windings of the armature are connected to the armature windings through a plurality of electronic switches, preferably of the semi-conductor type, which effect electronic commutation under the control of a relatively weak mechanically-commutated current.

Consequently, the strength of the current collected by means of the cummutator is reduced in a ratio equal to the current gain of the semi-conductor switches, so that the dimensions of the commutator, and therefore its cost and maintenance, are considerably reduced, while the reliability of operation is increased. It is possible more especially to envisage the construction of large machines without the use of commutating poles, utilising simply, as in known machines of lower power, a staggering of the brushes in relation to the neutral line in order to suppress sparking, which also affords a considerable saving in the cost of construction.

The low strength of the current through the commutator makes it possible to construct the latter in the form of a printed circuit.

By way of example, one embodiment of the invention is hereinafter described with reference to the accompanying drawings in which.

Figure 1:
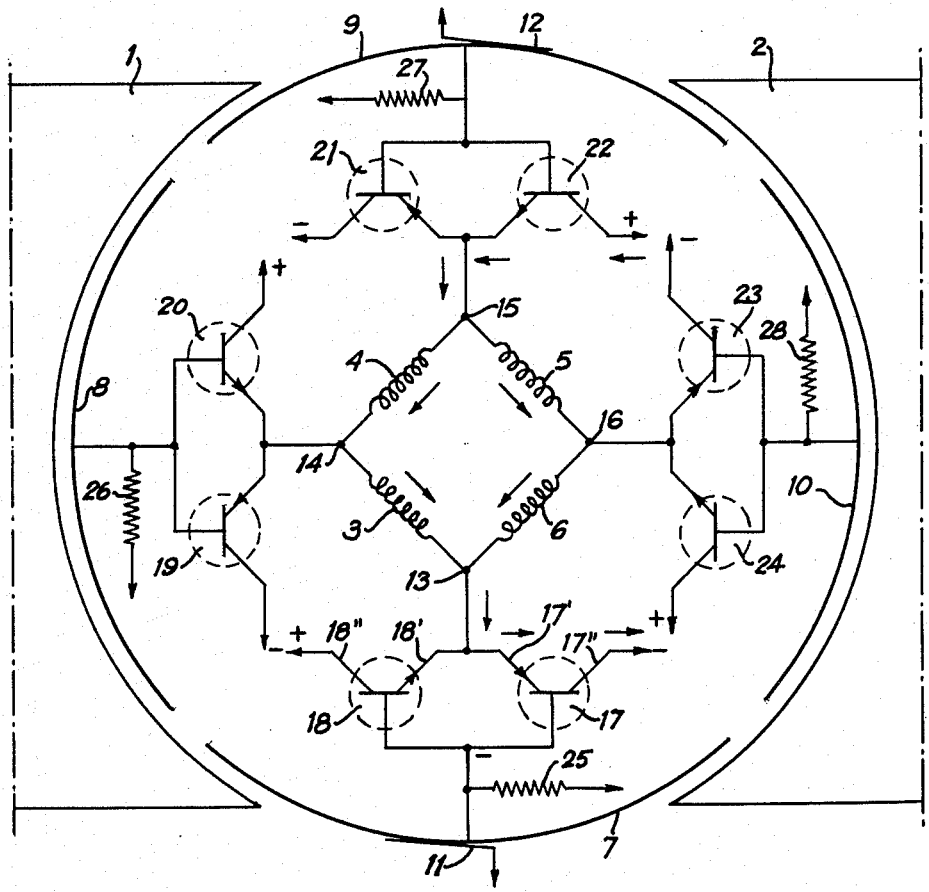
FIGURE 1 is a diagram explaining the principle of the operation of the machine.

For the sake of simplicity, the following explanations will be given with reference to a bipolar machine, the fields poles of which are denoted by the reference numerals 1 and 2. It is known that, in known direct-current machines, each coil of the armature winding is connected at its ends to two successive segments of the commutator and the brushes are disposed substantially along the neutral line, that is to say, in a plane perpendicular to the induction field, so as to commutate the current at the instant when the induction field through these coils changes direction.

In accordance with the invention, the ends of each coil of the armature winding are connected respectively to the successive segments of the commutator, each through two polarised electronic relays rotating integrally with the armature and connected in parallel, so that at the instant when one segment of the commutator passes under a brush connected to a positive or negative terminal of the feed source or of the load circuit, the current is set up through one of the relays and is cut off through the other, so that the direction of the current in the coil under consideration is reversed. In the diagram of FIGURE 1, there is shown an armature having four coils 3, 4, 5 and 6, and a commutator comprising four segments 7, 8, 9 and 10, on which there slide two brushes 11 and 12 connected to the negative and positive terminals respectively of the feed source (in the case of a motor) or the load circuit (in the case of a generator).

The four coils 3, 4, 5 and 6 are connected in series and each common point 13, 14, 15 and 16 of two adjacent coils is connected to one segment of the commutator through a pair of electronic transistor-type relays complementary to one another. One of the transistors of each pair, for example the transistors 17, 19, 20, 23, is of the PNP type, that is to say, becoming conductive when a negative voltage is applied to its base electrode, and the other transistor of each pair, i.e. the transistors 18, 20, 22, 24, is of the NPN type, that is to say, becoming conductive when a positive voltage is applied to its electrode base. As will be seen from the diagram of FIGURE 1, the bases of the transistors of each pair are connected on the one hand to one segment of the commutator and on the other hand through a resistance 25, 26, 27, 28 to a biasing source.

The emitter electrodes of each pair of transistors, for example the emitters 17' and 18', of the transistors 17 and 18 are connected together and to the common point of two adjacent coils, while the collector electrodes 17" and 18" are connected to the negative and positive terminals respectively of the feed source or to that of the load circuit, these connections of the electrodes of the transistors to the sources or external circuits being effected by means of rings or sliding contacts.

The machine according to the invention operates as follows:

In the case of operation as a motor, the brush 12 is connected to the positive terminal and the brush 11 to the negative terminal of a direct-current source. Likewise the collectors 17", 19", 20", 23", of the PNP transistors 17, 19, 20, 23, are connected to the negative terminal of the said source, while the collectors 18", 20", 22", 24", of the NPN transistors 18, 20, 22, 24, are connected to its negative terminal.

In the position illustrated in FIGURE 1, the bases of the pair of transistors 17, 18 are connected by the commutator segment 7 and the brush 11 to the negative terminal of the source, so that the transistor 17 is conductive, while since the bases of the pair of transistors 21, 22 are connected by the segments 9 and the brush 12 to the positive terminal, the transistor 22 is rendered conductive. The current therefore passes from the positive terminal through the transistor 22, the point 15 and the pairs of parallel-connected coils 4—3 and 5—6 in the direction of the arrows, to the point 13 and then through the transistor 17 to the negative terminal of the source. When the segments 7, 9 leave the brushes 11, 12, they are replaced by the segments 10 and 8 and the current continues to flow in the same way and in the same direction through the coils 3—6 and 6—5 owing to the transistors 20 and 23. After a half-revolution, the segment 9 comes into contact with the negative brush 11 and the segment 7 comes into contact with the positive brush 12, and the current flows through the coils 6—7 and 3—4, but this time it is the transistors 18 and 21 which are conductive, while the transistors 17 and 22 are non-conductive. It will therefore be seen that everything happens as in a normal machine in which the armature is directly connected to the commutator, with the essential difference that a weak control current flows through the commutator, while the current of high strength flows directly from the source via slip rings to the armature windings through the collector and emitter electrodes of the transistors, which also effect the electronic interruption of this current at the instant of the commutation.

It is to be noted that the biasing resistances 25, 26, 27, 28, of the bases of the collectors and the biasing voltage are so chosen as, on the one hand, to prevent the passage of the current through the PNP and NPN transistors in the absence of the control voltage supplied by the commutator, and on the other hand to render the effect of this permanent biasing negligible at the instant when the control voltage is applied to the bases of the transistors. In other words the transistors are switched between saturated and bottomed states.

The motor according to the invention may also be fed with alternating current by connection of the collectors of the transistors to the alternating-current source, the brushes 11 and 12 always being fed by a direct control voltage. Since the transistors become conductive only when voltages of appropriate sign are applied to the bases and to the collectors of the transistors, an automatic rectification occurs and everything happens as if the motor were fed with direct current. The passage of the harmonics of the alternating current through the windings of the armature can be prevented by shunting the windings by means of condensers.

In the case of operation as a direct-current generator, it is sufficient for the armature shaft to be driven at the desired speed and with the desired torque. The collector electrodes of the transistors are connected via slip rings to the terminals of the load circuit, while the emitter electrodes are connected to the armature as in the foregoing, and the brushes of the commutator are fed with direct current in the same way as in the case of the motor, for example connected to the exciter circuit. Since the commutation takes place under exactly the same conditions as above, the current supplied by the collector electrodes will always have the same direction.

Figure 2:
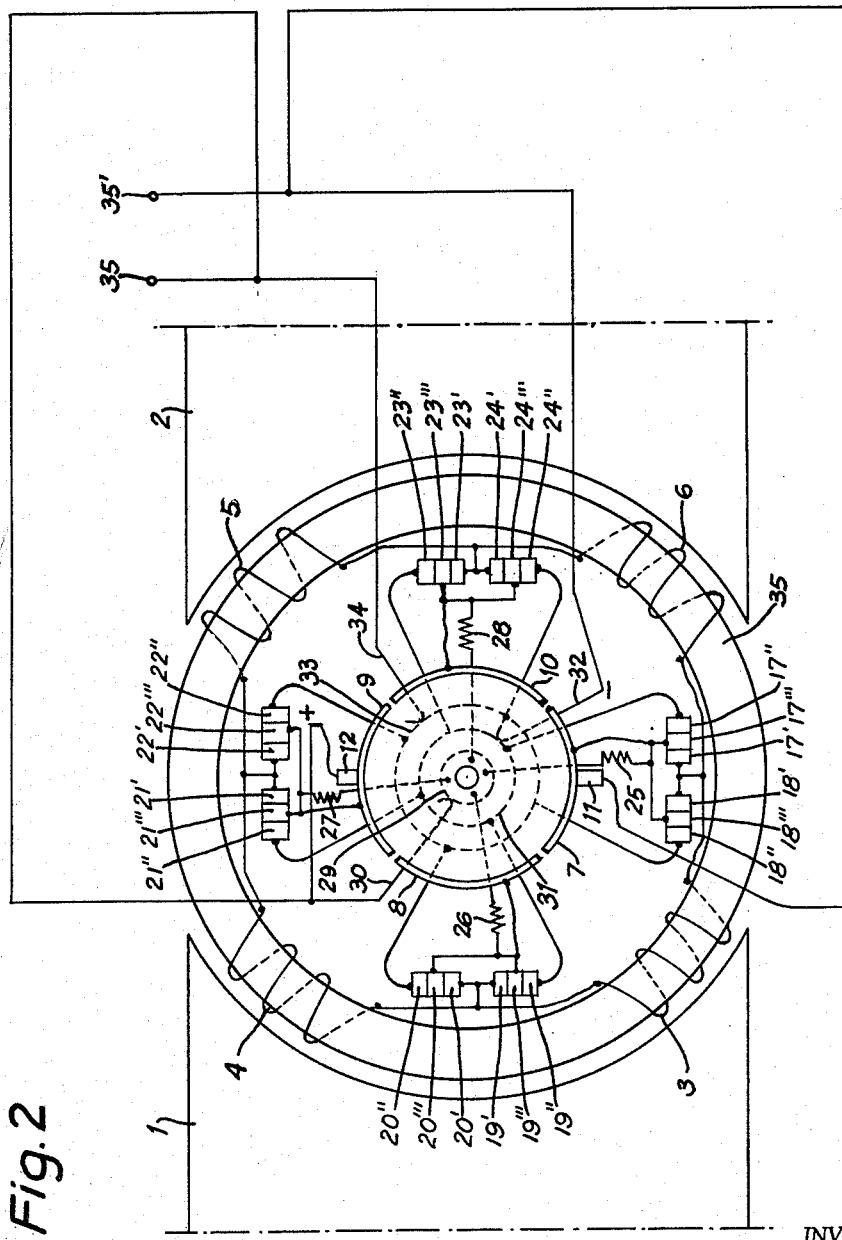
FIGURE 2 is a diagrammatic, transverse, sectional view of a bipolar machine embodying the invention.

As will be apparent from FIGURE 2, which illustrates diagrammatically a constructional form of the same bipolar machine having four coils 3, 4, 5, 6 mounted on the armature 35 as in FIGURE 1, the bases 17''', 18''', 19''' . . . of the transistors are connected by the resistances 25, 26, 27, 28 to an insulated ring 29 rotating with the armature, on which ring there is mounted a sliding contact 30 connected to earth or another biasing source (not shown). The collectors 17'', 19'', 21'', 23'' of the PNP transistors 17, 19, 21, 23 are connected to an insulated rotating ring 31 on which there slides a sliding contact 32 connected to the negative terminal of the feed source or to one of the terminals of the load, while the collectors 18'', 20'', 22'', 24'' of the NPN transistors 18, 20, 22, 24 are connected to the insulated rotating ring 33, against which there bears a sliding contact 34 connected to the positive terminal of the source or to the other terminal of the load.

Cooling of the transistors can readily be effected by providing them with fins which may constitute the blades of the fan which is in any case required for cooling the armature.

In servo-mechanism applications, it is possible to omit the power stage of the usual amplifier, since it is to some extent incorporated in the armature of a machine embodying the invention. The amplifier may be either of the direct-current type or of the alternating-current type.

In application to electric traction, either a direct-current supply or an alternating-current supply may be employed. The biasing feed of the bases can be effected either with the aid of resistance bridges, in the case of direct current supply, or with the aid of rectifiers, or even accumulators, in the case of alternating current supply.

Figure 3:
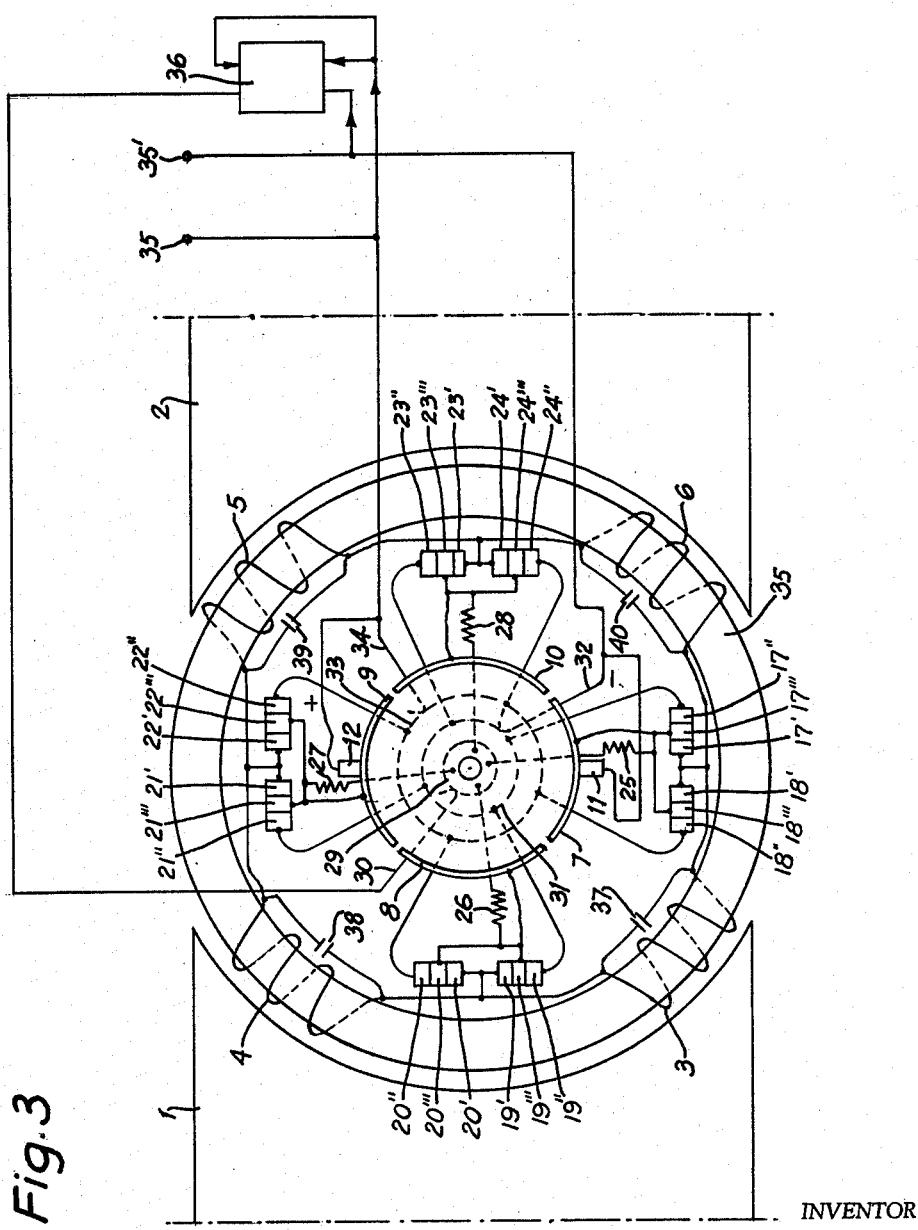
FIG. 3 is a diagram of a modification of the invention utilizing capacitors in parallel with the armature windings for the suppression of harmonics.

For instance, as shown in FIG. 3, the slip-rings 31, 33 are connected through sliding contacts 32, 34 to the terminals 35, 35' of a supply of alternating current, whereas the ring 29 connected to the biassing resistances 25, 26, 27, 28 is connected to the supply 35, 35' by the sliding contact 30 through the rectifier 36. The brushes 11, 12 of the commutator 7—10 are also connected to the A.C. supply 35, 35'. Capacitors 37, 38, 39, 40 are connected in parallel with armature windings 3, 4, 5, 6 respectively to prevent the passage therethrough of harmonics of the alternating current.

For applications to automobile vehicles or aircraft, in which the machine will operate sometimes at starting and sometimes as a generator during operation, interference affecting wireless or television carried on the vehicle or aircraft or belonging to other users will be considerably reduced. In any case, if additional suppression is required, this can simply be effected since the electromechanical commutation due to the commutator and resulting in interference affects only very weak currents.

It is obvious that the invention is applicable to all types of machines, e.g. series, parallel, separately-excited and other motors and generators.

I claim:

1. A rotary electric machine comprising a rotor, a plurality of armature windings in said rotor, a commutator having a plurality of commutator segments, a pair of slip rings for the non-commutated flow of current between said armature windings and the exterior, and a plurality of transistor switches each comprising an NPN transistors and PNP transistor, both with base, emitter and collector electrodes, means connecting the two emitter-collector paths of each said transistor pair between the two slip rings and said windings and means connecting the base electrodes of both transistors in each said pair to a respective commutator segment.

2. A rotary electric machine according to claim 1, wherein said windings, said switches and said segments are equal in number, said windings being connected in series, the emitter electrodes of both transistors of each pair being connected together to a respective junction of two adjacent ones of said windings and the collector electrodes of the two transistors of each pair being connected to the slip rings respectively.

3. A rotary electric machine according to claim 2, further comprising bias resistors and a third slip ring and wherein said base electrodes are further connected to said third slip ring through said bias resistors.

4. An electric motor comprising a rotor, a plurality of armature windings in said rotor, a commutator having a plurality of commutator segments, two brushes cooperating with said commutator, a pair of slip rings, provided with stationary contacts, a source of alternating current connected between said stationary contacts, a plurality of transistor switches arranged on said rotor to rotate therewith and each comprising an NPN transistor and a PNP transistor, both with base, emitter and collector electrodes, means to connect the emitter-collector paths of each said transistor pair between the two slip rings and said windings, means to connect the base electrodes of both transistors in each said pair to a respective commutator segment, bias resistors connected to said bases in each transistor pair, rectifying means having its input connected to the alternating current supply and its output connected to the bias resistors, and to the brushes of the commutator to the alternating current supply.

5. A motor according to claim 4 wherein capacitors are arranged in parallel with the armature windings to prevent the passage therethrough of harmonics of the alternating current.

6. A rotary electric machine comprising a rotor, a plurality of armature windings in said rotor, a commutator having a plurality of commutator segments, two brushes cooperating with said commutator, a source of direct voltage having its terminals connected to said brushes respectively, a pair of slip rings for the non-commutated flow of current between said armature windings and the exterior, a plurality of transistor switches arranged on the rotor and rotating therewith, each comprising an NPN transistor and a PNP transistor, both with base, emitter and collector electrodes, means connecting the two emitter-collector paths of each said transistor pair between the two slip rings and said windings, and means connecting the base electrodes of both transistors in each pair to a respective commutator segment whereby the current in said windings is electronically commutated by said transistor switches responsive to the mechanical commutation of direct voltage applied to the bases thereof.

7. An electric motor according to claim 6, wherein the slip rings are each provided with a stationary contact and with means connecting said contacts to the terminals of the source of direct voltage respectively.

References Cited in the file of this patent
UNITED STATES PATENTS

| | | |
|---|---|---|
| 1,873,966 | Kern | Aug. 30, 1932 |
| 2,980,839 | Haeusserman | Apr. 18, 1961 |
| 3,025,443 | Wilkinson et al. | Mar. 13, 1962 |